United States Patent
Feng et al.

(10) Patent No.: US 11,131,557 B2
(45) Date of Patent: Sep. 28, 2021

(54) FULL-VISION NAVIGATION AND POSITIONING METHOD, INTELLIGENT TERMINAL AND STORAGE DEVICE

(71) Applicant: HuiZhou TCL Mobile Communication Co., Ltd., HuiZhou (CN)

(72) Inventors: Xu Feng, HuiZhou (CN); Tao Mao, HuiZhou (CN); Yusen Zheng, HuiZhou (CN); Mingliang Liu, HuiZhou (CN); Yanbin Liang, HuiZhou (CN); Xiping Xia, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 41 days.

(21) Appl. No.: 16/630,519

(22) PCT Filed: Jul. 17, 2018

(86) PCT No.: PCT/CN2018/095912
§ 371 (c)(1),
(2) Date: Jan. 13, 2020

(87) PCT Pub. No.: WO2019/015562
PCT Pub. Date: Jan. 24, 2019

(65) Prior Publication Data
US 2020/0158528 A1    May 21, 2020

(30) Foreign Application Priority Data
Jul. 17, 2017 (CN) .................. 201710582179.X

(51) Int. Cl.
*G01C 21/36* (2006.01)
*H04L 12/26* (2006.01)

(52) U.S. Cl.
CPC ..... *G01C 21/3635* (2013.01); *G01C 21/3647* (2013.01); *H04L 43/50* (2013.01)

(58) Field of Classification Search
CPC  G01C 21/3635; G01C 21/3647; G01C 21/34; H04L 43/50
See application file for complete search history.

(56) References Cited

U.S. PATENT DOCUMENTS 8,972,174 B2    3/2015  Jeung et al.
2007/0130153 A1*  6/2007  Nachman ............... H04W 4/02
(Continued)

FOREIGN PATENT DOCUMENTS

| CN | 101109643 | 1/2008 |
| CN | 103471580 | 12/2013 |

(Continued)

OTHER PUBLICATIONS

International Search Report and the Written Opinion dated Oct. 10, 2018 From the International Searching Authority Re. Application No. PCT/CN2018/095912 and Its Translation of Search Report Into English. (11 Pages).

*Primary Examiner* — Aaron L Troost

(57) ABSTRACT

A full-vision navigation and positioning method for a smart terminal is proposed. The smart terminal turns on a 3D full visual navigation and performs a network speed test. When a network speed is higher than or equal to a threshold value, the smart terminal turns on a camera to obtain images of a current street view and upload the images. The smart terminal compares the images with a 3D panorama map to feedback a current position and utilizes a 3D navigation system to continue navigation according to the current position.

12 Claims, 2 Drawing Sheets

(56) References Cited

U.S. PATENT DOCUMENTS

| | | | | |
|---|---|---|---|---|
| 2012/0224694 | A1* | 9/2012 | Lu | ........................ H04W 12/033 380/270 |
| 2013/0090849 | A1 | 4/2013 | Uetake | |
| 2013/0332066 | A1* | 12/2013 | Jeung | ................. G01C 21/3602 701/420 |
| 2016/0156524 | A1* | 6/2016 | Kanda | ................. H04L 43/0852 370/232 |

FOREIGN PATENT DOCUMENTS

| | | |
|---|---|---|
| CN | 104897164 | 9/2015 |
| CN | 106226794 | 12/2016 |
| CN | 107389086 | 11/2017 |
| WO | WO 2019/015562 | 1/2019 |

\* cited by examiner

FULL-VISION NAVIGATION AND POSITIONING METHOD, INTELLIGENT TERMINAL AND STORAGE DEVICE

RELATED APPLICATIONS

This application is a National Phase of PCT Patent Application No. PCT/PCT/CN2018/095912 having International filing date of Jul. 17, 2018, which claims the benefit of priority of Chinese Patent Application No. 201710582179.X, filed on Jul. 17, 2017. The contents of the above applications are all incorporated by reference as if fully set forth herein in their entirety.

FIELD AND BACKGROUND OF THE INVENTION

The present invention relates to a navigation technique in a smart terminal, and more particularly, to a full visual navigation positioning method and related smart terminal and storage device thereof.

Because the current design of the appearance of the electronic equipments, the GPS antenna of the electronic equipments becomes worse. When a user wants to use the equipment (such as smart communication equipments, including cell phone, tablet, and automotive navigation system) to navigate in a place that full of buildings or trees, the positioning function often works slowly. Sometimes, the signal is interrupted, the navigation system cannot work at all, or the positioning time is too long. Even if the navigation can work, the indication of the navigation system may not be straight forward such that the user needs to take time to understand the indication. Therefore, the above-mentioned issues need to be solved.

SUMMARY

One objective of an embodiment of the present invention is to provide a full visual navigation positioning method and related smart terminal and storage device thereof. The method could utilize the assisted global positioning system (AGPS) to roughly determine the position of the user and then utilize the data in the backend and the icon image of the street view to perform a comparison such that the method could quickly determine the user's position according to the comparison result and navigate according to the user's position. This makes the navigation more efficient.

According to an embodiment of the present invention, a full visual navigation positioning method is disclosed. The method comprises: utilizing a smart terminal to turn on a 3D full visual navigation and performing a network speed test through a backend of the smart terminal; when the smart terminal determines that a network speed m is higher than or equal to a threshold value x, turning on a camera to obtain images of a current street view and upload the images; and comparing the images with a 3D panorama map to feedback a current position and utilizing a 3D navigation system to continue navigation according to the current position.

According to an embodiment of the present invention, a smart terminal is disclosed. The smart terminal comprises a processor and a storage device electrically connected to the processor, configured to store a program. The program instructions stored in the storage device are executed by the processor to perform operations, the operations comprise: utilizing the smart terminal to turn on a 3D full visual navigation and performing a network speed test through a backend of the smart terminal; when the smart terminal determines that a network speed m is higher than or equal to a threshold value x, turning on a camera to obtain images of a current street view and upload the images; and comparing the images with a 3D panorama map to feedback a current position and utilizing a 3D navigation system to continue navigation according to the current position.

Optionally, the operation of utilizing the smart terminal to turn on the 3D full visual navigation and performing the network speed test through the backend of the smart terminal comprises: presetting the threshold value x, representing a lowest network speed of the 3D full visual navigation; and presetting a lowest network threshold value y required by an assisted global positioning system (AGPS).

Optionally, the operation of utilizing the smart terminal to turn on the 3D full visual navigation and performing the network speed test through the backend of the smart terminal comprises: after the smart terminal turns on the 3D full visual navigation, performing a pre-positioning operation according to a closest base station information through the AGPS; and when the pre-positioning operation is being performed, controlling the backend of the smart terminal to detect the current network speed m.

Optionally, the operation of turning on the camera to obtain images of the current street view and upload the images when the step of the smart terminal determines that the network speed m is higher than or equal to the threshold value x comprises: comparing the network speed m detected by the smart terminal with the threshold value x; and when the network speed m is higher than or equal to the threshold value x, reading a base station information and controlling the camera to obtain the images and upload the images to a cloud 3D map processor.

Optionally, after the operation of comparing the network speed m detected by the smart terminal with the threshold value x, the program instructions stored in the storage device are executed by the processor to further perform: comparing the network speed m with the lowest network threshold value y if the network speed is less than the threshold value x.

Optionally, the program instructions stored in the storage device are executed by the processor to further perform: if the network speed m is higher than or equal to the lowest network threshold value y, utilizing the AGPS and a map to navigate.

Optionally, the program instructions stored in the storage device are executed by the processor to further perform: if the network speed m is less than the lowest network threshold value y, utilizing a global positioning system (GPS) to navigate.

Optionally, the operation of comparing the images with the 3D panorama map to feedback the current position and utilizing the 3D navigation system to continue navigation according to the current position comprises: comparing the images uploaded to the cloud 3D map processor with the 3D panorama map provided by a third party to perform a street view comparison; performing a positioning operation according to a feedback position information provided by the cloud 3D map processor; and utilizing the 3D navigation system to continue navigation according to a set destination.

According to an embodiment of the present invention, a storage device is disclosed. The storage device stores program instructions executed by the processor to perform operations, the operations comprise: utilizing the smart terminal to turn on a 3D full visual navigation and performing a network speed test through a backend of the smart terminal; when the smart terminal determines that a network speed m is higher than or equal to a threshold value x, turning on a camera to obtain images of a current street view and upload the images; and comparing the images with a 3D panorama map to feedback a current position and utilizing a 3D navigation system to continue navigation according to the current position.

Optionally, the operation of utilizing the smart terminal to turn on the 3D full visual navigation and performing the network speed test through the backend of the smart terminal comprises: presetting the threshold value x, representing a lowest network speed of the 3D full visual navigation; and presetting a lowest network threshold value y required by an assisted global positioning system (AGPS).

Optionally, the operation of utilizing the smart terminal to turn on the 3D full visual navigation and performing the network speed test through the backend of the smart terminal comprises: after the smart terminal turns on the 3D full visual navigation, performing a pre-positioning operation according to a closest base station information through the AGPS; and when the pre-positioning operation is being performed, controlling the backend of the smart terminal to detect the current network speed m.

Optionally, the operation of turning on the camera to obtain images of the current street view and upload the images when the step of the smart terminal determines that the network speed m is higher than or equal to the threshold value x comprises: comparing the network speed m detected by the smart terminal with the threshold value x; and when the network speed m is higher than or equal to the threshold value x, reading a base station information and controlling the camera to obtain the images and upload the images to a cloud 3D map processor.

In contrast to the conventional art, the present invention provides a full visual navigation positioning method and related smart terminal and storage device thereof. The method comprises: utilizing a smart terminal to turn on a 3D full visual navigation and performing a network speed test through a backend of the smart terminal; when the smart terminal determines that a network speed m is higher than or equal to a threshold value x, turning on a camera to obtain images of a current street view and upload the images; and comparing the images with a 3D panorama map to feedback a current position and utilizing a 3D navigation system to continue navigation according to the current position. The present invention could utilize a camera to scan the street view, utilize the AGPS to roughly perform the positioning function and utilize the data in the backend and the icon image of the street view to perform a comparison such that the method could quickly determine the user's position according to the comparison result and navigate according to the user's position. This makes the navigation more efficient.

DESCRIPTION OF SPECIFIC EMBODIMENTS OF THE INVENTION

Specifically, the terminologies in the embodiments of the present invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

Figure 1:
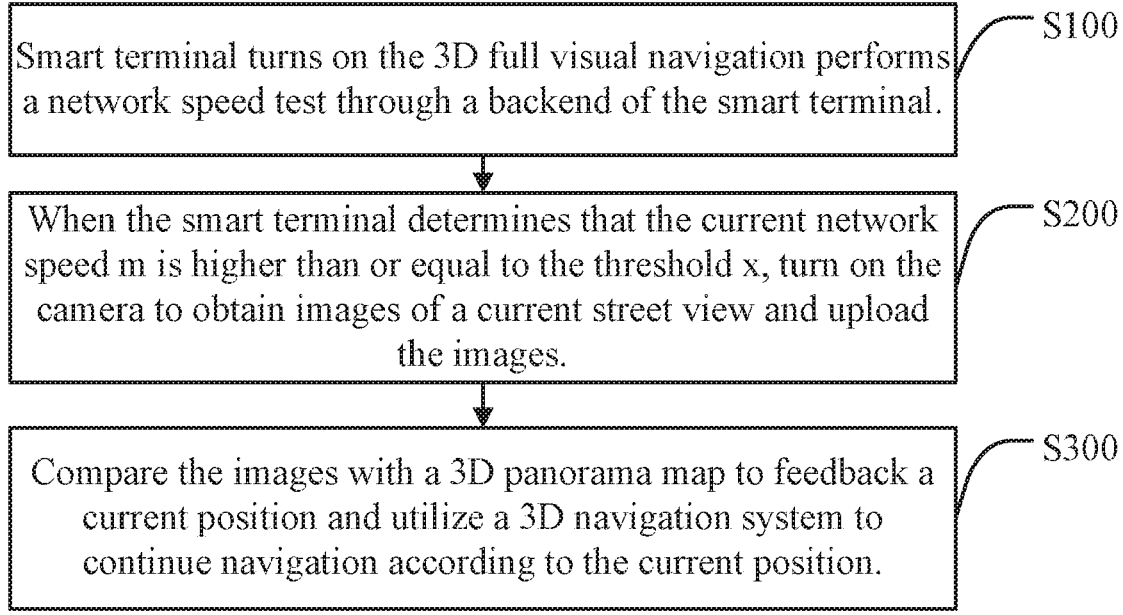
FIG. 1 is a flow chart of a full visual navigation positioning method according to an embodiment of the present invention.

Please refer to FIG. 1. FIG. 1 is a flow chart of a full visual navigation positioning method according to an embodiment of the present invention. As shown in FIG. 1, the full visual navigation positioning method comprises following steps:

Step S100: The smart terminal turns on the 3D full visual navigation performs a network speed test through a backend of the smart terminal.

Specifically, before the step S100, the method further comprises: presetting a lowest network speed threshold x of the full visual 3D positioning navigation and presetting a lowest network speed threshold y required by the AGPS.

In this embodiment, AGPS, a type of GPS which could utilize information of the smart terminal base station in coordination of GPS satellites to accelerate the positioning process, is firstly used to perform a pre-positioning. The AGPS provides the communication equipment (smart terminal) with rough positioning information according to the closest base station. The communication equipment could read the rough positioning information and utilize the camera to scan the street view.

The Step S100 comprises:

Step S101: After the smart terminal turns on the 3D full visual navigation, perform a pre-positioning according to a closest base station information through the AGPS; and Step S102: When the pre-positioning is being performed, control the backend of the smart terminal to detect the current network speed m.

Step S200: When the smart terminal determines that the current network speed m is higher than or equal to the threshold x, turn on the camera to obtain images of a current street view and upload the images.

Specifically, the threshold x represents the lowest network speed threshold of the full visual 3D positioning navigation and the threshold y represents the lowest network speed threshold required by the AGPS. After the 3D full visual navigation is turned on, the backend of the smart terminal performs the network speed test and obtains the position information of the base station. When the current network speed m is higher than or equal to the threshold x, the camera of the smart terminal is turned on and provides an audio message "please face the camera to the street" such that the camera could obtain the images of the street view (such as some icon buildings of the street) and the obtained images are uploaded.

Step S200 comprises:

Step S201: Compare the network speed m detected by the smart terminal with the threshold value x; and Step S202: When the network speed m is higher than or equal to the threshold value x, read a base station information and control the camera to obtain the images and upload the images to a cloud 3D map processor.

The step s200 further comprises: When the network speed m is less than the threshold x, compare the network speed m with the threshold y. If the network speed m is higher than or equal to the lowest network threshold value y, utilize the AGPS and a map to navigate.

Step S300: Compare the images with a 3D panorama map to feedback a current position and utilize a 3D navigation system to continue navigation according to the current position.

According to the previous rough positioning and the comparison between the obtained images with the 3D panorama map of a third party, the user's position could be quickly determined and the navigation could be continued according to the user's position. In other words, using full visual navigation could allow the user to perform the positioning more efficiently such that the navigation could be more efficient as well.

The conventional positioning procedure needs about 10 seconds. In this embodiment, the positioning procedure only requires less than 5 seconds if the network connection is good. If the network speed cannot reach the lowest network speed threshold, the present invention could automatically switch to a normal positioning operation of the communication equipment.

The step S300 comprises:

Step S301: Compare the images uploaded to the cloud 3D map processor with the 3D panorama map provided by a third party to perform a street view comparison;

Step S302: Perform a positioning operation according to a feedback position information provided by the cloud 3D map processor; and Step S303: Utilize the 3D navigation system to continue navigation according to a set destination.

Figure 2:
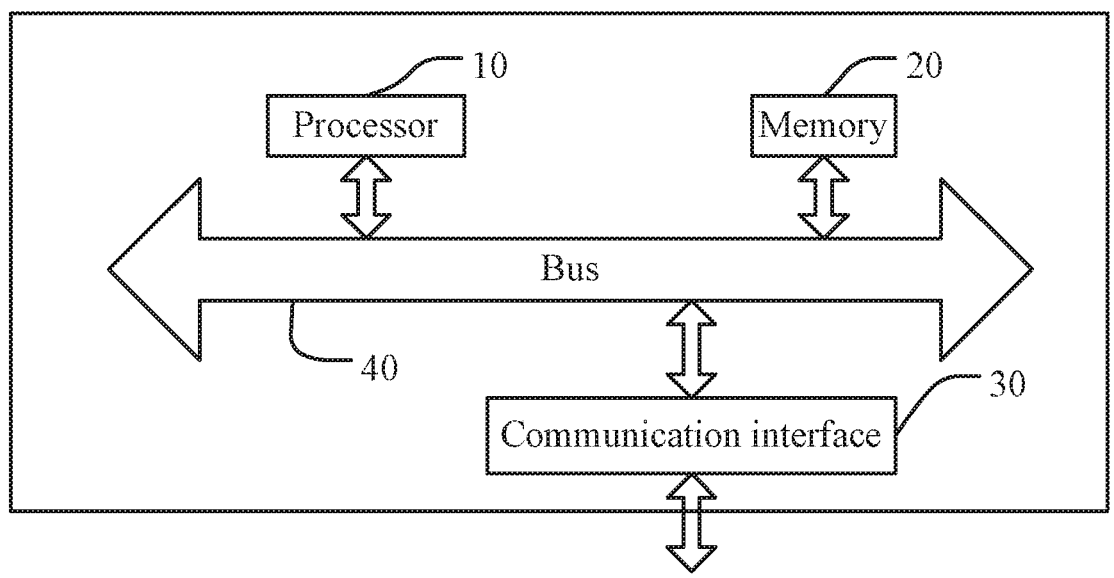
FIG. 2 is a functional block diagram of a smart terminal a according to an embodiment of the present invention.
Figure 3:
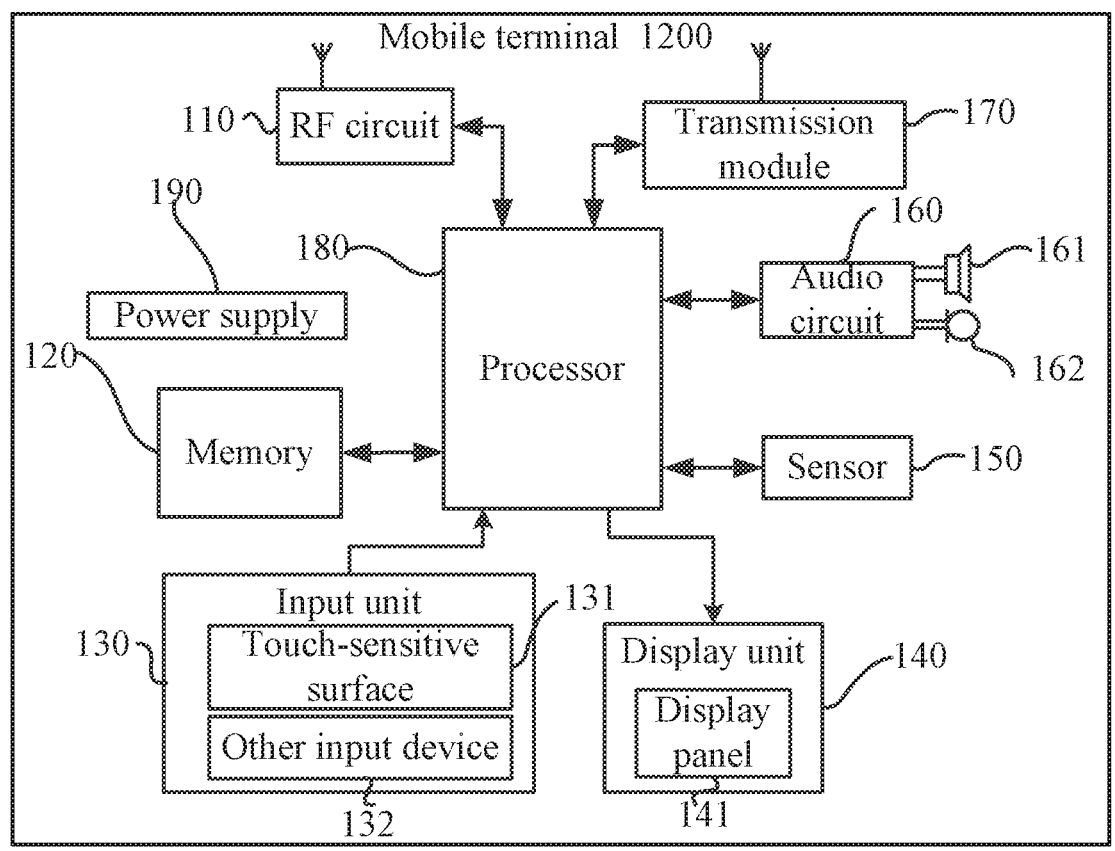
FIG. 3 is a diagram of a structure of a smart terminal a according to an embodiment of the present invention.

In addition, the present invention provides a smart terminal. As shown in FIG. 2, the smart terminal comprises a processor 10, a memory 20, a communication interface 30 and a bus 40. The processor 10, the memory 20 and the communication interface 30 communicate with each other through the bus 40. The communication interface 30 is used to communicate with communication equipments of the smart terminals. The processor 10 is used to load and execute the programs stored in the memory 20 to perform the above method, such as the steps of utilizing a smart terminal to turn on a 3D full visual navigation and performing a network speed test through a backend of the smart terminal; when the smart terminal determines that a network speed m is higher than or equal to a threshold value x, turning on a camera to obtain images of a current street view and upload the images; and comparing the images with a 3D panorama map to feedback a current position and utilizing a 3D navigation system to continue navigation according to the current position Please refer to FIG. 3. FIG. 3 is a diagram of a structure of a smart terminal a according to an embodiment of the present invention. The smart terminal could be used to implement the above-mentioned method. The smart terminal 1200 could be a smart phone or a tablet.

As shown in FIG. 3, the mobile terminal 1200 may comprise components, such as a radio frequency (RF) circuit 110, a memory 120 including one or more (only one is shown in the figure) computer-readable storage media, an input unit 130, a display unit 140, a sensor 150, an audio circuit 160, a transmission module 170, a processor 180 including one or more (only one is shown in the figure) processing cores, and a power supply 190, etc. Those skilled in the art would understand that the mobile terminal 1200 is not limited to the structure of the mobile terminal 1200 shown in FIG. 3. The mobile terminal 1200 may comprise more or less components than those illustrated in the figure, or some components may be combined, or may have different components arrangements.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include another input device 132. Specifically, another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 3, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the terminal 1200 may further include a camera (a front camera or a rear camera), a Bluetooth module, and the like, which are not further described herein. Specifically, in this embodiment, the display unit of the terminal 1200 is a touch screen display, and the terminal 1200 further includes a memory and one or more programs. The one or more programs are stored in the memory and configured to be executed by one or more processors. The one or more programs contain instructions used for performing the operations as follows:

utilizing the smart terminal to turn on a 3D full visual navigation and performing a network speed test through a backend of the smart terminal;

when the smart terminal determines that a network speed m is higher than or equal to a threshold value x, turning on a camera to obtain images of a current street view and upload the images; and comparing the images with a 3D panorama map to feedback a current position and utilizing a 3D navigation system to continue navigation according to the current position.

Furthermore, the operation of utilizing the smart terminal to turn on the 3D full visual navigation and performing the network speed test through the backend of the smart terminal comprises:

presetting the threshold value x, representing a lowest network speed of the 3D full visual navigation; and presetting a lowest network threshold value y required by an assisted global positioning system (AGPS).

Furthermore, the operation of utilizing the smart terminal to turn on the 3D full visual navigation and performing the network speed test through the backend of the smart terminal comprises:

after the smart terminal turns on the 3D full visual navigation, performing a pre-positioning operation according to a closest base station information through the AGPS; and when the pre-positioning operation is being performed, controlling the backend of the smart terminal to detect the current network speed m.

Furthermore, the operation of turning on the camera to obtain images of the current street view and upload the images when the step of the smart terminal determines that the network speed m is higher than or equal to the threshold value x comprises:

comparing the network speed m detected by the smart terminal with the threshold value x; and when the network speed m is higher than or equal to the threshold value x, reading a base station information and controlling the camera to obtain the images and upload the images to a cloud 3D map processor.

Furthermore, after the operation of comparing the network speed m detected by the smart terminal with the threshold value x, the program instructions stored in the storage device are executed by the processor to further perform:

comparing the network speed m with the lowest network threshold value y if the network speed is less than the threshold value x.

Furthermore, the program instructions stored in the storage device are executed by the processor to further perform:

if the network speed m is higher than or equal to the lowest network threshold value y, utilizing the AGPS and a map to navigate.

Furthermore, the program instructions stored in the storage device are executed by the processor to further perform:

if the network speed m is less than the lowest network threshold value y, utilizing a global positioning system (GPS) to navigate.

Furthermore, the operation of comparing the images with the 3D panorama map to feedback the current position and utilizing the 3D navigation system to continue navigation according to the current position comprises:

comparing the images uploaded to the cloud 3D map processor with the 3D panorama map provided by a third party to perform a street view comparison;

performing a positioning operation according to a feedback position information provided by the cloud 3D map processor; and utilizing the 3D navigation system to continue navigation according to a set destination.

The present invention further provides a storage device. The storage device could store a program to be executed to perform the above-mentioned full visual navigation method.

From the above, the present invention provides a full visual navigation positioning method and related smart terminal and storage device thereof. The method comprises: utilizing a smart terminal to turn on a 3D full visual navigation and performing a network speed test through a backend of the smart terminal; when the smart terminal determines that a network speed m is higher than or equal to a threshold value x, turning on a camera to obtain images of a current street view and upload the images; and comparing the images with a 3D panorama map to feedback a current position and utilizing a 3D navigation system to continue navigation according to the current position. The present invention could utilize a camera to scan the street view, utilize the AGPS to roughly perform the positioning function and utilize the data in the backend and the icon image of the street view to perform a comparison such that the method could quickly determine the user's position according to the comparison result and navigate according to the user's position. This makes the navigation more efficient.

Please note, one or more steps of the above-mentioned full visual navigation method could be achieved by instructing related hardware components (such as processor or controllers) through one or more programs. The above-mentioned programs could be stored in a computer readable storage medium such as a memory, a hard disk, an optical disk or etc.

Above are embodiments of the present invention, which does not limit the scope of the present invention. Any modifications, equivalent replacements or improvements within the spirit and principles of the embodiment described above should be covered by the protected scope of the invention.

What is claimed is:

1. A full visual navigation positioning method, the method comprising:

presetting a threshold value x, representing a lowest network speed of the 3D full visual navigation, and presetting a lowest network threshold value y required by an assisted global positioning system (AGPS);

after a smart terminal turns on the 3D full visual navigation, performing a pre-positioning operation according to a closest base station information through the AGPS;

when the pre-positioning operation is being performed, controlling a backend of the smart terminal to detect the current network speed m;

when the smart terminal determines that the network speed m is higher than or equal to the threshold value x, turning on a camera to obtain images of a current street view and upload the images; and comparing the images with a 3D panorama map to feedback a current position and utilizing a 3D navigation system to continue navigation according to the current position.

2. The method of claim 1, wherein the step of turning on the camera to obtain images of the current street view and upload the images when the step of the smart terminal determines that the network speed m is higher than or equal to the threshold value x comprises:

comparing the network speed m detected by the smart terminal with the threshold value x; and when the network speed m is higher than or equal to the threshold value x, reading a base station information and controlling the camera to obtain the images and upload the images to a cloud 3D map processor.

3. The method of claim 2, further comprising:

after the step of comparing the network speed m detected by the smart terminal with the threshold value x, comparing the network speed m with the lowest network threshold value y if the network speed is less than the threshold value x.

4. The method of claim 3, further comprising:

if the network speed m is higher than or equal to the lowest network threshold value y, utilizing the AGPS and a map to navigate.

5. The method of claim 3, further comprising:

if the network speed m is less than the lowest network threshold value y, utilizing a global positioning system (GPS) to navigate.

6. The method of claim 2, wherein the step of comparing the images with the 3D panorama map to feedback the current position and utilizing the 3D navigation system to continue navigation according to the current position comprises:

comparing the images uploaded to the cloud 3D map processor with the 3D panorama map provided by a third party to perform a street view comparison;
performing a positioning operation according to a feedback position information provided by the cloud 3D map processor; and
utilizing the 3D navigation system to continue navigation according to a set destination.

7. A smart terminal comprising:
a processor;
a storage device, electrically connected to the processor, configured to store program instructions;
wherein the program instructions stored in the storage device are executed by the processor to perform operations, the operations comprising:
presetting a threshold value x, representing a lowest network speed of the 3D full visual navigation, and presetting a lowest network threshold value y required by an assisted global positioning system (AGPS);
after a smart terminal turns on the 3D full visual navigation, performing a pre-positioning operation according to a closest base station information through the AGPS;
when the pre-positioning operation is being performed, controlling a backend of the smart terminal to detect the current network speed m;
when the smart terminal determines that the network speed m is higher than or equal to the threshold value x, turning on a camera to obtain images of a current street view and upload the images; and
comparing the images with a 3D panorama map to feedback a current position and utilizing a 3D navigation system to continue navigation according to the current position.

8. The smart terminal of claim 7, wherein the operation of turning on the camera to obtain images of the current street view and upload the images when the step of the smart terminal determines that the network speed m is higher than or equal to the threshold value x comprises:
comparing the network speed m detected by the smart terminal with the threshold value x; and
when the network speed m is higher than or equal to the threshold value x, reading a base station information and controlling the camera to obtain the images and upload the images to a cloud 3D map processor.

9. The smart terminal of claim 8, wherein after the operation of comparing the network speed m detected by the smart terminal with the threshold value x, the program instructions stored in the storage device are executed by the processor to further perform:
comparing the network speed m with the lowest network threshold value y if the network speed is less than the threshold value x.

10. The smart terminal of claim 9, wherein the program instructions stored in the storage device are executed by the processor to further perform:
if the network speed m is higher than or equal to the lowest network threshold value y, utilizing the AGPS and a map to navigate.

11. The smart terminal of claim 9, wherein the program instructions stored in the storage device are executed by the processor to further perform:
if the network speed m is less than the lowest network threshold value y, utilizing a global positioning system (GPS) to navigate.

12. The smart terminal of claim 8, wherein the operation of comparing the images with the 3D panorama map to feedback the current position and utilizing the 3D navigation system to continue navigation according to the current position comprises:
comparing the images uploaded to the cloud 3D map processor with the 3D panorama map provided by a third party to perform a street view comparison;
performing a positioning operation according to a feedback position information provided by the cloud 3D map processor; and
utilizing the 3D navigation system to continue navigation according to a set destination.

* * * * *